(12) United States Patent
Matsuno et al.

(10) Patent No.: US 9,586,620 B2
(45) Date of Patent: Mar. 7, 2017

(54) TRAVEL CONTROL APPARATUS FOR VEHICLE

(71) Applicant: FUJI JUKOGYO KABUSHIKI KAISHA, Tokyo (JP)

(72) Inventors: Koji Matsuno, Tokyo (JP); Harunobu Horiguchi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/045,548

(22) Filed: Feb. 17, 2016

(65) Prior Publication Data
US 2016/0272243 A1 Sep. 22, 2016

(30) Foreign Application Priority Data
Mar. 17, 2015 (JP) ................................. 2015-053599

(51) Int. Cl.
*B60W 30/12* (2006.01)
*B62D 15/02* (2006.01)
(Continued)

(52) U.S. Cl.
CPC ......... *B62D 15/025* (2013.01); *G05D 1/0088* (2013.01); *G05D 1/0219* (2013.01); *G05D 1/0231* (2013.01); *G01C 21/26* (2013.01)

(58) Field of Classification Search
USPC ................................. 701/41, 301, 23, 28, 65
See application file for complete search history.

(56) References Cited

U.S. PATENT DOCUMENTS

| 4,720,790 A | * | 1/1988 | Miki | ...................... | B62D 7/159 180/415 |
| 5,276,620 A | * | 1/1994 | Bottesch | .................. | B62D 6/04 180/422 |

(Continued)

FOREIGN PATENT DOCUMENTS

| JP | 2010-083395 A | 4/2010 |
| JP | 2011-046256 A | 3/2011 |
| JP | 2014-184747 A | 10/2014 |

OTHER PUBLICATIONS

Notice of Reasons for Refusal issued in corresponding Japanese Application No. 2015-053599, dated Jun. 7, 2016.
(Continued)

*Primary Examiner* — Thomas Tarcza
*Assistant Examiner* — Richard Goldman
(74) *Attorney, Agent, or Firm* — McDermott Will & Emery LLP

(57) ABSTRACT

A travel control apparatus for a vehicle includes a frontward environment recognition unit, a map information storage unit, a vehicle position information obtaining unit, a traveling road information obtaining unit, a rut information detector, a first course setting unit, a second course setting unit, and a target course setting unit. A target course over a road surface on which a vehicle is to travel is set as a first course on the basis of map information, the target course over the road surface on which the vehicle is to travel is set as a second course or a third course on the basis of rut information, the first course is compared with the second and third courses, and the target course over the road surface on which the vehicle is to travel is set on the basis of traveling road information and the rut information.

15 Claims, 3 Drawing Sheets

(51) Int. Cl.
*G05D 1/00* (2006.01)
*G05D 1/02* (2006.01)
*G01C 21/26* (2006.01)

(56) References Cited

U.S. PATENT DOCUMENTS

| | | | | |
|---|---|---|---|---|
| 5,938,707 A * | 8/1999 | Uehara | ................ | G05D 1/0261 180/167 |
| 8,681,036 B2 * | 3/2014 | Beer | ....................... | G01S 13/90 342/22 |
| 2001/0041953 A1 * | 11/2001 | Jitsukata | ................ | G01C 21/26 701/28 |
| 2004/0024528 A1 * | 2/2004 | Patera | .................... | G08G 5/045 701/301 |
| 2004/0030498 A1 * | 2/2004 | Knoop | ..................... | B60T 7/22 701/301 |
| 2005/0159876 A1 * | 7/2005 | Sugano | .............. | B60K 31/0008 701/96 |
| 2006/0020389 A1 * | 1/2006 | Yamamoto | ............. | G01C 21/26 701/494 |
| 2011/0040482 A1 * | 2/2011 | Brimble | ................ | G01S 7/4814 701/301 |
| 2012/0065861 A1 * | 3/2012 | Hartmann | ........... | B60T 8/17558 701/71 |
| 2012/0078483 A1 * | 3/2012 | Yajima | .................. | B60T 8/1764 701/73 |
| 2013/0211720 A1 * | 8/2013 | Niemz | ................... | G01C 21/20 701/538 |
| 2014/0074388 A1 * | 3/2014 | Bretzigheimer | .......... | B60T 1/10 701/117 |
| 2015/0005982 A1 * | 1/2015 | Muthukumar | ............ | B60T 1/10 701/1 |
| 2015/0019094 A1 * | 1/2015 | Larkin | ................... | B60K 23/08 701/65 |
| 2015/0253775 A1 * | 9/2015 | Jacobus | ................. | G05D 1/024 701/23 |
| 2016/0144838 A1 * | 5/2016 | Spencer | .................... | B60T 7/12 701/70 |

OTHER PUBLICATIONS

Decision of Grant issued in corresponding Japanese Application No. 2015-053599, dated Sep. 13, 2016.

* cited by examiner

TRAVEL CONTROL APPARATUS FOR VEHICLE

CROSS-REFERENCE TO RELATED APPLICATIONS

The present application claims priority from Japanese Patent Application No. 2015-053599, filed on Mar. 17, 2015, the entire contents of which are hereby incorporated by reference.

BACKGROUND

1. Technical Field

The present invention relates in particular to a travel control apparatus for a vehicle, which enables the vehicle to travel with stability even when a rut exists in a road.

2. Related Art

Recently, various apparatuses employing automatic driving techniques that enable a driver to drive a vehicle in increased comfort and more safely have been developed and proposed. Japanese Unexamined Patent Application Publication (JP-A) No. 2014-184747, for example, discloses a technique employed in a travel control apparatus for a vehicle that detects a travelable region of a vehicle and executes locus control on the basis of a target vehicle behavior amount calculated to enable the vehicle to travel through the travelable region. According to this technique, when the travelable region is a curve having a curvature and a rut is detected on an inner side of the curve, the target vehicle behavior amount is corrected so that an inner wheel of the vehicle travels in the detected rut on the inner side of the curve.

The technique for a vehicle control apparatus disclosed in JP-A No. 2014-184747 is effective in improving the vehicle behavior and the stability of steering control while travelling along a rut. However, the rut condition of a road varies constantly, and the vehicle behaves highly erratically whenever the vehicle falls into and pulls out of a rut. It is therefore preferable, in terms of maintaining continuous stability in the vehicle behavior, to ensure that the vehicle does not repeatedly fall into and pull out of a rut while travelling. In addition to the problems arising when the vehicle falls into and pulls out of a rut, during travel within a particularly narrow rut having a width no greater than that of a single tire, a ground contact condition of the tire may become unstable, with the result that desired braking and driving force cannot be generated. Furthermore, even when the technique for a vehicle control apparatus disclosed in JP-A No. 2014-184747 is employed during travel in a normal rut, a road surface friction coefficient difference may occur between the rutted road surface and the non-rutted road surface, and as a result, a yaw moment may be generated during braking or acceleration, leading to instability in the vehicle behavior.

SUMMARY OF THE INVENTION

It is desirable to provide a travel control apparatus for a vehicle, which is capable of performing travel control with improved stability by ensuring that vehicle behavior and steering control do not become unstable even when travelling on a road having a rutted road surface.

An aspect of the present invention provides a travel control apparatus for a vehicle, the travel control apparatus having a frontward environment recognition unit that obtains frontward environment information by recognizing a frontward environment of the vehicle on the basis of image information, a map information storage unit that stores map information, a vehicle position information obtaining unit that obtains position information indicating a position of the vehicle, a traveling road information obtaining unit that obtains traveling road information relating to a traveling road of the vehicle on the basis of the map information and the position information of the vehicle, a rut information detector that detects a rut on a road surface on the basis of the frontward environment information, and obtains information relating to the rut, a first course setting unit that sets a target course over a road surface on which the vehicle is to travel as a first course on the basis of the map information, a second course setting unit that sets the target course over the road surface on which the vehicle is to travel as a second course on the basis of the rut information, and a target course setting unit that compares the first course with the second course, and sets the target course over the road surface on which the vehicle is to travel on the basis of the traveling road information and the rut information.

DETAILED DESCRIPTION

An implementation of the present invention will be described below on the basis of the drawings.

Figure 1:
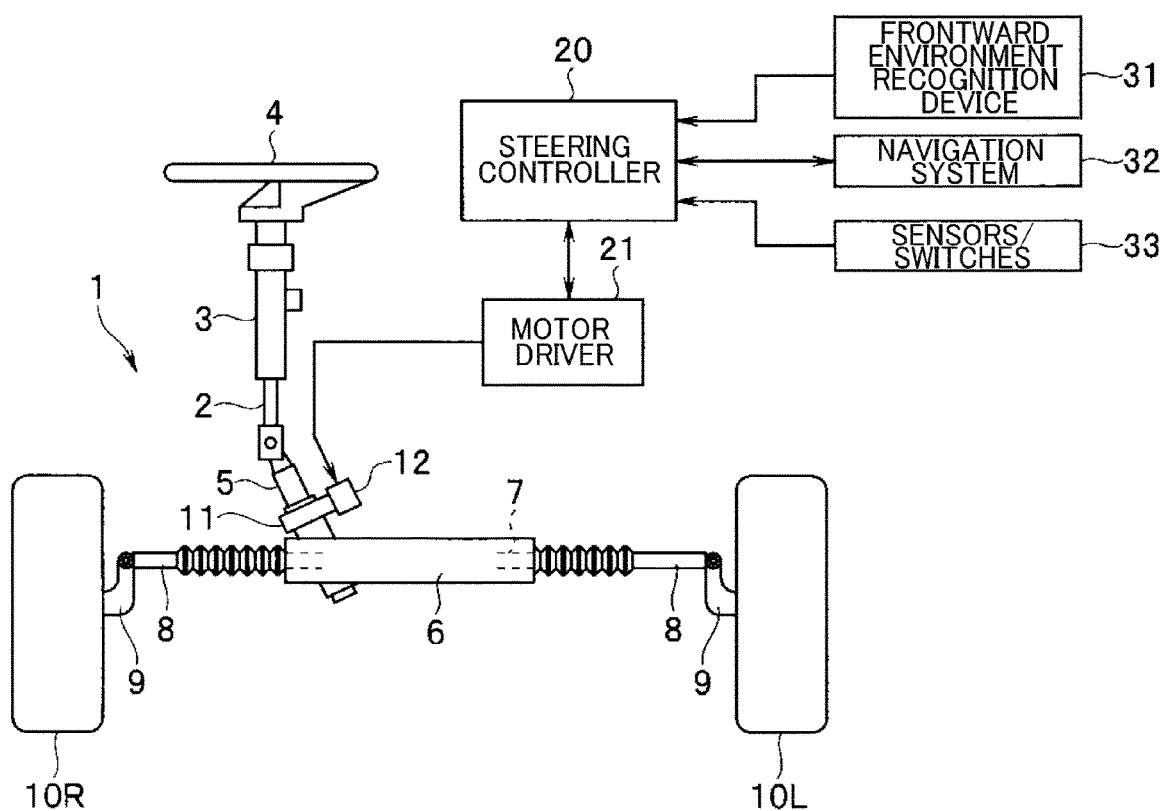
FIG. 1 illustrates a configuration of a steering system of a vehicle according to an implementation of the present invention.

FIG. 1 illustrates a configuration of a steering system of a vehicle according to the implementation. In FIG. 1, a reference numeral 1 denotes an electric power steering device capable of setting a steering angle freely, independently of driver input. In the electric power steering device 1, a steering shaft 2 is supported on a vehicle body frame, not illustrated in the drawing, to be free to rotate via a steering column 3 such that one end thereof extends to a driving seat side and another end extends to an engine room side. A steering wheel 4 is fixed to the driving seat side end of the steering shaft 2, and a pinion shaft 5 is connected to the end of the steering shaft 2 that extends to the engine room side.

A steering gearbox 6 that extends in a vehicle width direction is disposed in the engine room, and a rack shaft 7 is inserted into and supported by the steering gearbox 6 so as to be free to reciprocate. A pinion formed on the pinion shaft 5 meshes with a rack (not illustrated) formed on the rack shaft 7, and as a result, a rack and pinion type steering gear mechanism is formed.

Further, left-right ends of the rack shaft 7 project from respective ends of the steering gearbox 6, and front knuckles 9 are connected to the respective ends via a tie rod 8. The front knuckles 9 support left and right wheels 10L, 10R serving as steered wheels to be free to rotate, and are supported steerably on the vehicle body frame. Hence, when the steering wheel 4 is operated such that the steering shaft 2 and the pinion shaft 5 rotate, the rack shaft 7 moves in a left-right direction in response to the rotation of the pinion shaft 5, and in response to this movement, the front knuckles 9 rotate about kingpin shafts (not illustrated) such that the left and right wheels 10L, 10R are steered in the left-right direction.

Furthermore, an electric power steering motor (an electric motor) 12 is connected to the pinion shaft 5 via an assist transmission mechanism 11, and the electric motor 12 is configured to assist steering torque applied to the steering wheel 4 and apply set target control amounts. The electric motor 12 is driven by a motor driver 21 by outputting an electric power steering motor current value to the motor driver 21 from a steering controller 20, to be described below, as a control output value.

The steering controller 20 either serves as a part of an automatic driving control apparatus, not illustrated in the drawings, or is connected to the automatic driving control apparatus in order to set a target course along which the vehicle is to travel, and perform travel control on the vehicle along the set target course by performing conventional control such as feedforward control and feedback control in relation to the target course.

For this purpose, signals from a frontward environment recognition device 31 that obtains frontward environment information by recognizing a frontward environment of the vehicle, a navigation system 32 that detects vehicle position information (latitude and longitude, a movement direction, and so on), displays the vehicle position on map information, and provides route guidance to a destination, and other sensors/switches 33 are input into the steering controller 20.

The frontward environment recognition device 31 is constituted by a set of cameras attached at fixed intervals to a front side of a vehicle cabin ceiling, for example, in order to capture stereo images of subjects on the exterior of the vehicle from different viewpoints, and a stereo image processor that processes image data obtained from the cameras.

The processing implemented by the stereo image processor of the frontward environment recognition device 31 on the image data from the cameras is as follows, for example. First, a distance image is generated by determining distance information in relation to a set of stereo images captured by the cameras in an traveling direction of the vehicle from deviation amounts of corresponding positions.

To recognize data indicating a lane division line such as a white line, luminance variation in a width direction of a road is evaluated on the basis of the knowledge that a white line exhibits higher luminance than a road surface, whereupon a left-right position of the lane division line on an image plane is specified on the image plane. An actual spatial position (x, y, z) of the lane division line is calculated using a conventional coordinate conversion formula on the basis of a position (i, j) on the image plane and a parallax calculated in relation to this position, or in other words on the basis of the distance information. In this implementation, a coordinate system of an actual space set using the position of the vehicle as a reference is set such that the road surface directly below the center of the cameras serves as an origin, the vehicle width direction serves as an x axis, a vehicle height direction serves as a y axis, and a vehicle length direction (a distance direction) serves as a z axis. At this time, when the road is flat, an x-z plane (y=0) is in alignment with the road surface. A road model is expressed by dividing a travel lane of the vehicle on the road into a plurality of sections in the distance direction, approximating left and right lane division lines in each section in a predetermined manner, and connecting the approximated lane division lines.

Further, the frontward environment recognition device 31 performs conventional grouping processing on the basis of data of a distance image expressing a three-dimensional distance distribution, and compares pre-stored three-dimensional road shape data, three-dimensional object data, and so on in order to extract side wall data indicating guard rails, curbstones, central reservations, and so on existing alongside a road, and three-dimensional object data indicating vehicles and the like. With regard to the three-dimensional object data, a distance to the three-dimensional object and temporal variation in the distance (a relative speed relative to the vehicle) are determined, whereupon a particular vehicle that is closest to the vehicle on a traveling road of the vehicle and that is travelling at a predetermined speed (at or above 0 km/h, for example) in a substantially identical direction to the vehicle is extracted as a preceding vehicle. Note that a preceding vehicle having a speed of approximately 0 km/h is recognized as a stationary preceding vehicle.

Furthermore, as disclosed in JP-A No. 2014-184747, for example, the frontward environment recognition device 31 obtains information relating to a rut on the road surface (a position on the road surface, a groove width, a depth, and so on) by combining the image information from the cameras with frontward laser beam scanning information from a radar device, not illustrated in the drawings. Note that when it is possible to detect the rut information using only the image information from the frontward environment recognition device 31, the rut information may be detected from the image information alone. In one implementation, the frontward environment recognition device 31 may be provided as a "frontward environment recognition unit" and a "rut information detector".

Further, the navigation system 32 is a conventional system that, for example, obtains position information (latitude and longitude) indicating the position of the vehicle by receiving radio wave signals from a GPS (Global Positioning System) satellite, obtains a vehicle speed from the sensors, and obtains movement direction information from a geomagnetic sensor, a gyro sensor, or the like. The navigation system 32 is configured to include a navigation ECU that generates route information used to realize a navigation function, a map database storing map information (supplier data and data updated in a predetermined fashion), and a display such as a liquid crystal display, for example (none of which are illustrated in the drawings).

The navigation ECU displays route information to a destination specified by a user so as to be superimposed on a map image displayed on the display, and displays the current position of the vehicle so as to be superimposed on the map image displayed on the display on the basis of information indicating the detected position, speed, travel direction, and so on of the vehicle. Further, the map database stores information required to construct a road map, such as node data and facility data. The node data relate to positions and shapes of roads constituting the map image, and include, for example, data indicating coordinates (latitudes and longitudes) of width direction center points of roads (lanes) and points (node points) on roads that include bifurcation points (intersections), directions and classifications (information indicating expressways, trunk roads, and urban roads, for example) of the roads that include the node points, as well as road types (straight sections, arc sections (arc-shaped curves), and clothoid curve sections (gentle curves)) and curve curvatures (or radii) at the node points. Hence, the traveling road of the vehicle is specified from the map position in which the current position of the vehicle is superimposed, and traveling road information such as the curve curvature (or the radius) of the road and the direction of the road is obtained from information indicating the node point that is closest to the position of the vehicle using the traveling road of the vehicle as a target traveling route. Furthermore, the facility data include data relating to facilities existing in the vicinity of the respective node points, and are stored in association with the node data (or link data indicating links on which the nodes exist). In one implementation, the navigation system 32 may be provided as a "map information storage unit", a "vehicle position information obtaining unit", and a "traveling road information obtaining unit".

Figure 2:
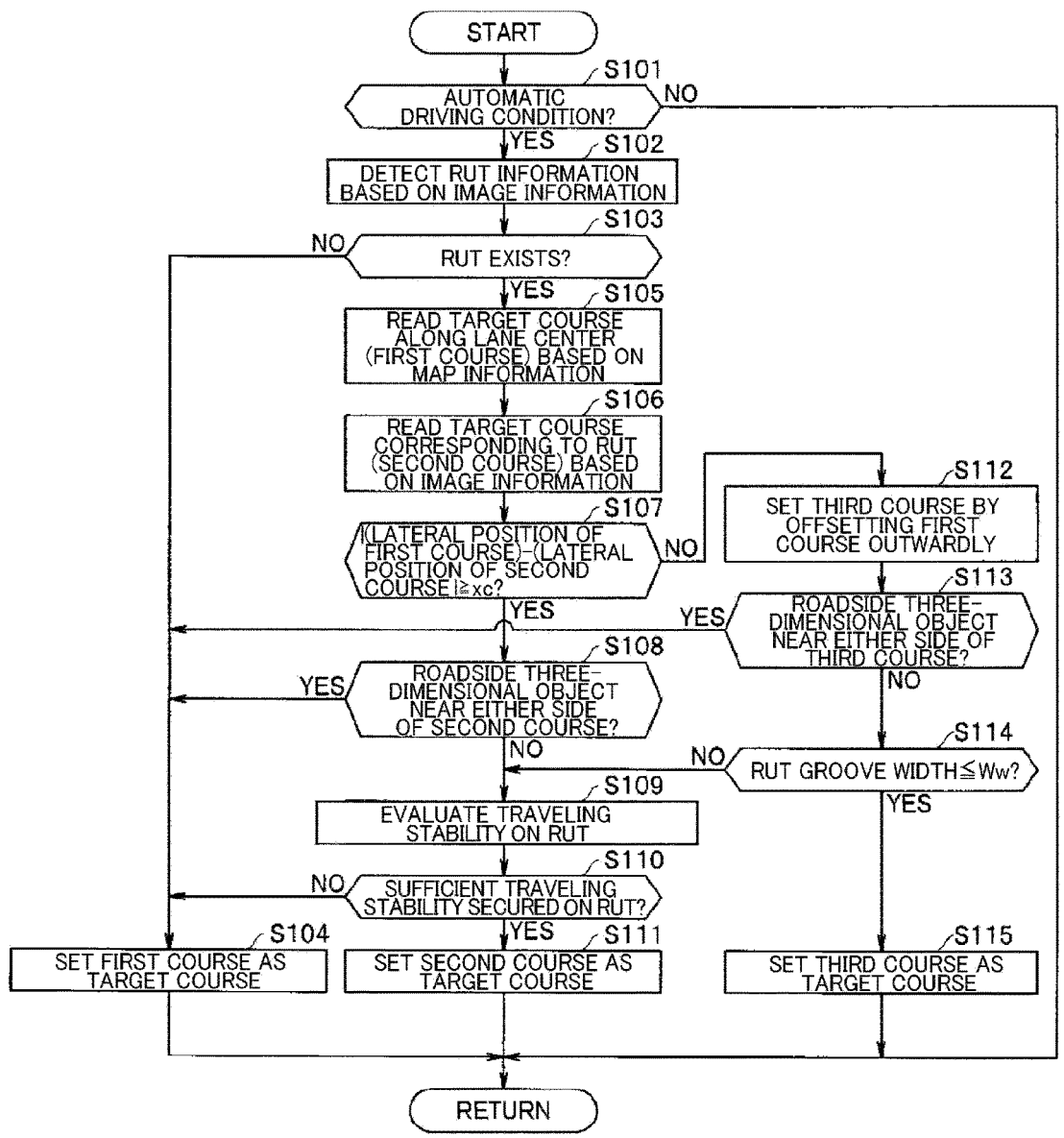
FIG. 2 is a flowchart illustrating an automatic driving control program according to this implementation of the present invention.

On the basis of the respective input signals described above and in accordance with a flowchart of an automatic driving control program, illustrated in FIG. 2, the steering controller 20 sets a target course over a road surface on which the vehicle is to travel as a first course on the basis of the map information, sets the target course over the road surface on which the vehicle is to travel as a second course on the basis of the rut information, compares the first course with the second course, and sets the target course over the road surface on which the vehicle is to travel on the basis of the traveling road information and the rut information. In one implementation, the steering controller 20 may be configured to function as a "first course setting unit", a "second course setting unit", a "target course setting unit", and an "automatic driving controller".

Automatic driving control executed by the steering controller 20 will be described below in accordance with the flowchart illustrated in FIG. 2.

First, in step (abbreviated to "S" hereafter) 101, a determination is made as to whether or not an automatic driving condition is established. When the automatic driving condition is not established, the program is terminated as is.

When it is determined in S101 that the automatic driving condition is established, the program advances to S102, where the rut information indicating a rut on the road surface is detected on the basis of the image information, as described above.

Next, the program advances to S103, where a determination is made as to whether or not a rut exists on the road surface. When a rut does not exist, the program advances to S104, where the first course set on the basis of the map information is set as the target course over the road surface on which the vehicle is to travel. The program is then terminated. The first course set on the basis of the map information is a course obtained by linking the width direction center points of the road (the lane), obtained from the map information, for example.

When it is determined in S103 that a rut exists on the road surface, on the other hand, the program advances to S105, where a target course along the center of the lane, or in other words a similar course to the first course described in S104, is read on the basis of the map information.

Next, the program advances to S106, where a target course corresponding to the rut is read as the second course on the basis of the image information. More specifically, when left and right ruts are detected, a central position between the ruts is set and read as the second course. Further, when a rut is detected on only one of the left and right sides, a position corresponding to substantially ½ the vehicle width, using the detected rut as a reference, is read as the second course.

The program then advances to S107, where a determination is made as to whether or not a difference between a lateral position of the first course and a lateral position of the second course, i.e. |(lateral position of first course)−(lateral position of second course)|, equals or exceeds a threshold xc set in advance by experiment, calculation, and so on.

When it is found as a result of the determination that |(lateral position of first course)−(lateral position of second coursed)|≥xc, the program advances to S108, where a determination is made as to whether or not a roadside obstruction (for example, a parked vehicle, an oncoming vehicle, a pedestrian, a guard rail, a utility pole, or the like) exists in the vicinity of either side of the second course.

When it is found as a result of the determination of S108 that a roadside obstruction exists in the vicinity of either side of the second course, the program advances to S104, where the first course set on the basis of the map information is set as the target course. The program is then terminated.

When, on the other hand, it is determined that a roadside obstruction does not exist in the vicinity of either side of the second course, the program advances to S109, where processing for evaluating the traveling stability on the rut is executed. The processing for evaluating the traveling stability on the rut is performed by detecting a black ice condition or a wet road condition on the road surface and, after detecting one of these conditions, determining that a large road surface friction coefficient difference exists between the rut and a compacted snow part in which the rut is not formed, and therefore that the traveling stability on the rut is insufficient.

As disclosed in Japanese Unexamined Patent Application Publication No. 2010-83395, for example, a black ice condition is detected on the road surface by detecting a plurality of rack thrust values at different sampling times as an estimated rack thrust value, estimating a rack thrust value to be used as a reference (a reference rack thrust) at an identical timing to the estimated rack thrust value using a tire model that includes at least the road surface friction coefficient as a parameter, and determining a value of the road surface friction coefficient at which at least a deviation between the estimated rack thrust value and the reference rack thrust is minimized by performing an optimization calculation. When the calculated value of the road surface friction coefficient is smaller than a preset value, the road surface is determined to be in a black ice condition.

Further, as disclosed in Japanese Unexamined Patent Application Publication No. 2011-46256, for example, a wet road condition is detected on the road surface by estimating the road surface condition from a road surface temperature, tire vibration (vibration input into the tire from the road surface during travel), and tire noise (noise generated in the vicinity of a ground contact surface of the tire when the tire contacts the road surface), and determining whether or not the road surface is in a wet road condition.

After performing the processing for evaluating the traveling stability on the rut in S109, the program advances to S110, where a determination is made as to whether or not sufficient traveling stability can be secured on the rut.

Figure 3:
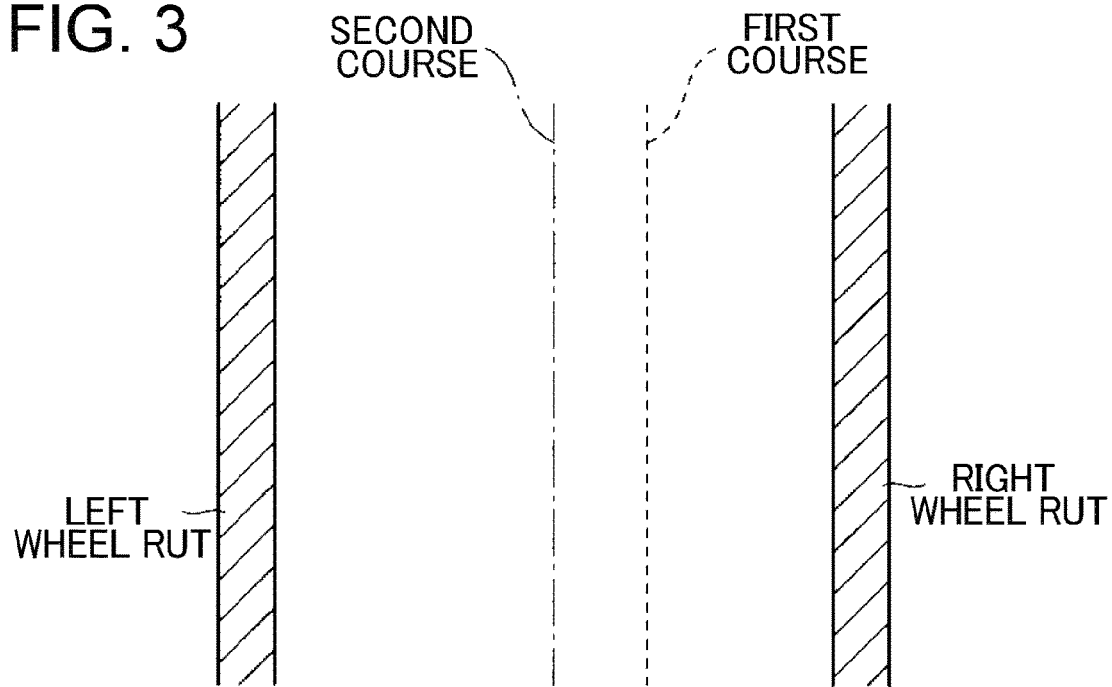
FIG. 3 illustrates a target course set in a case where a first course and a second course deviate from each other, according to the implementation of the present invention.

When it is determined that sufficient traveling stability can be secured on the rut, the program advances to S111, where the second course set in accordance with the rut on the basis of the image information is set as the target course. The program is then terminated (see FIG. 3).

When it is determined that sufficient traveling stability cannot be secured on the rut, on the other hand, the program advances to S104, where the first course set on the basis of the map information is set as the target course. The program is then terminated.

Figure 4:
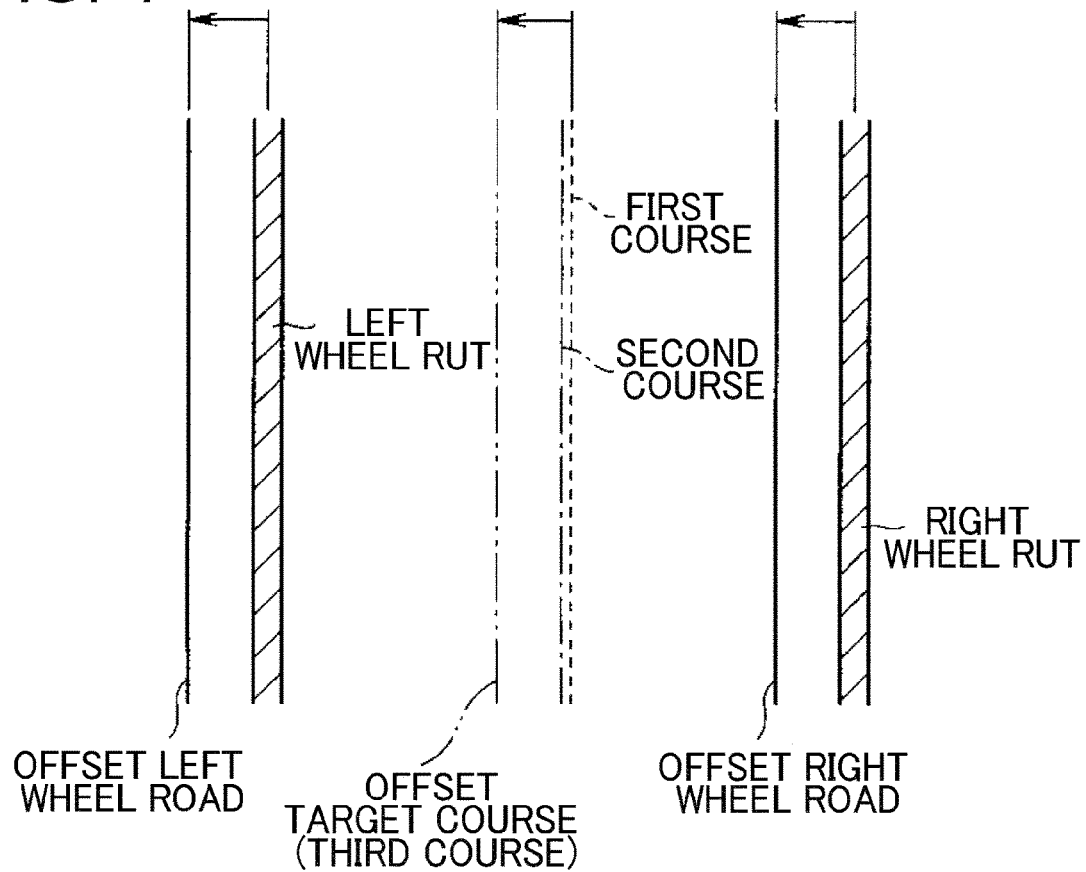
FIG. 4 illustrates a target course set in a case where the first course and the second course are in substantially identical positions and a rut has a narrow groove width, according to the implementation of the present invention.

Meanwhile, when it is determined in S107 that |(lateral position of first course)−(lateral position of second course)|<xc and that the lateral position of the first course substantially matches the lateral position of the second course, the program advances to S112, where a third course is set by applying an outward distance offset set in advance by experiment, calculation, and so on to the first course (see FIG. 4). The program then advances to S113, where, similarly to S108, a determination is made as to whether or not a roadside obstruction (for example, a parked vehicle, an oncoming vehicle, a pedestrian, a guard rail, a utility pole, or the like) exists in the vicinity of either side of the third course.

When it is found as a result of the determination of S113 that a roadside obstruction exists in the vicinity of either side of the third course, the program advances to S104, where the first course set on the basis of the map information is set as the target course. The program is then terminated.

When, on the other hand, it is determined that a roadside obstruction does not exist in the vicinity of either side of the third course, the program advances to S114.

In S114, a determination is made as to whether or not the rut is a narrow rut having a groove width no greater than a predetermined value (the tire width, for example) Ww.

When it is found as a result of the determination that the groove width of the rut is greater than the predetermined value (the tire width, for example) Ww, and therefore determined that the rut has a normal groove width, processing is performed from S109.

When, on the other hand, the rut is determined to be a narrow rut having a groove width no greater than the predetermined value (the tire width, for example) Ww, the program advances to S115, where the third course is set as the target course in order to prevent instability in the ground contact condition of the tire. The program is then terminated. The reason for this is to ensure that the left and right wheels can travel under identical conditions (identical road surface friction coefficients and so on), thereby stabilizing the vehicle behavior. Note that the determination of S114 as to whether or not the rut has a narrow groove width does not necessarily have to be performed on the basis of the image information, and the vehicle may also be determined to be traveling in a narrow rut when yaw rate variation in a predetermined short period, steering wheel angle variation, vehicle wheel acceleration variation, vertical acceleration variation, or camera image blurring, for example, occurs during travel on the rut.

Hence, according to this implementation of the present invention, the target course over the road surface on which the vehicle is to travel is set as the first course on the basis of the map information, and the target course over the road surface on which the vehicle is to travel is set as the second course on the basis of the rut information. The first course is then compared with the second course, and when a deviation between the first course and the second course in a lateral direction of the road surface equals or exceeds the predetermined value xc, the second course is set as the target course over the road surface on which the vehicle is to travel. Meanwhile, when the deviation between the first course and the second course in the lateral direction of the road surface is smaller than the predetermined value xc and the groove width of the rut is no greater than the predetermined value Ww, a third course obtained by applying a preset distance offset to the first course in a roadside direction is set as the target course over the road surface on which the vehicle is to travel. Hence, the vehicle behavior and the steering control do not become unstable even when travelling on a road having a rutted road surface and even when the rut is narrow, and as a result, travel control can be performed with improved stability.

The invention claimed is:

1. A travel control apparatus for a vehicle, the travel control apparatus comprising:
    a frontward environment recognition unit that obtains frontward environment information by recognizing a frontward environment of the vehicle on the basis of image information;
    a map information storage unit that stores map information;
    a vehicle position information obtaining unit that obtains position information indicating a position of the vehicle;
    a traveling road information obtaining unit that obtains traveling road information relating to a traveling road of the vehicle on the basis of the map information and the position information of the vehicle;
    a rut information detector that detects a rut on a road surface on the basis of the frontward environment information, and obtains information relating to the rut;
    a first course setting unit that sets a target course over a road surface on which the vehicle is to travel as a first course on the basis of the map information;
    a second course setting unit that sets the target course over the road surface on which the vehicle is to travel as a second course on the basis of the rut information, along at least one of a rut extending forward from the left side of the vehicle or a rut extending forward from the right side of the vehicle; and
    a target course setting unit that compares the first course with the second course, and sets the target course on the basis of the traveling road information and the rut information, such that vehicle behavior and steering control do not become unstable and the vehicle can travel on the road surface stably.

2. The travel control apparatus for a vehicle according to claim 1, wherein the target course setting unit sets the second course as the target course over the road surface on which the vehicle is to travel, when a deviation between the first course and the second course in a lateral direction of the road surface equals or exceeds a first predetermined value.

3. The travel control apparatus for a vehicle according to claim 1, wherein the target course setting unit sets a third course obtained by applying a preset distance offset to the first course in a roadside direction as the target course over the road surface on which the vehicle is to travel, when a deviation between the first course and the second course in a lateral direction of the road surface is smaller than a first predetermined value and a groove width of the rut is no greater than a second predetermined value.

4. The travel control apparatus for a vehicle according to claim 2, wherein the target course setting unit sets a third course obtained by applying a preset distance offset to the first course in a roadside direction as the target course over the road surface on which the vehicle is to travel, when the deviation between the first course and the second course in the lateral direction of the road surface is smaller than the first predetermined value and a groove width of the rut is no greater than a second predetermined value.

5. The travel control apparatus for a vehicle according to any claim 1, wherein the target course setting unit evaluates a traveling stability during travel along the second course, and when determining that the traveling stability is insufficient, sets the first course as the target course over the road surface on which the vehicle is to travel.

6. The travel control apparatus for a vehicle according to any claim 2, wherein the target course setting unit evaluates a traveling stability during travel along the second course, and when determining that the traveling stability is insufficient, sets the first course as the target course over the road surface on which the vehicle is to travel.

7. The travel control apparatus for a vehicle according to any claim 3, wherein the target course setting unit evaluates a traveling stability during travel along the second course, and when determining that the traveling stability is insufficient, sets the first course as the target course over the road surface on which the vehicle is to travel.

8. The travel control apparatus for a vehicle according to claim 1, wherein the target course over the road surface on which the vehicle is to travel, set by the target course setting unit, is a course on which no roadside three-dimensional objects exist near both sides of the target course.

9. The travel control apparatus for a vehicle according to claim 2, wherein the target course over the road surface on which the vehicle is to travel, set by the target course setting unit, is a course on which no roadside three-dimensional objects exist near both sides of the target course.

10. The travel control apparatus for a vehicle according to claim 3, wherein the target course over the road surface on which the vehicle is to travel, set by the target course setting unit, is a course on which no roadside three-dimensional objects exist near both sides of the target course.

11. The travel control apparatus for a vehicle according to claim 4, wherein the target course over the road surface on which the vehicle is to travel, set by the target course setting unit, is a course on which no roadside three-dimensional objects exist near both sides of the target course.

12. The travel control apparatus for a vehicle according to claim 1, further comprising
   an automatic driving controller that executes automatic driving control on the vehicle,
   wherein the target course setting unit sets the target course over the road surface on which the vehicle is to travel, only when the automatic driving control is being executed by the automatic driving controller.

13. The travel control apparatus for a vehicle according to claim 2, further comprising
   an automatic driving controller that executes automatic driving control on the vehicle,
   wherein the target course setting unit sets the target course over the road surface on which the vehicle is to travel, only when the automatic driving control is being executed by the automatic driving controller.

14. The travel control apparatus for a vehicle according to claim 3, further comprising
   an automatic driving controller that executes automatic driving control on the vehicle,
   wherein the target course setting unit sets the target course over the road surface on which the vehicle is to travel, only when the automatic driving control is being executed by the automatic driving controller.

15. The travel control apparatus for a vehicle according to claim 4, further comprising
   an automatic driving controller that executes automatic driving control on the vehicle,
   wherein the target course setting unit sets the target course over the road surface on which the vehicle is to travel, only when the automatic driving control is being executed by the automatic driving controller.

* * * * *